(12) United States Patent
Mermoud et al.

(10) Patent No.: US 11,416,522 B2
(45) Date of Patent: Aug. 16, 2022

(54) UNSUPERVISED LEARNING OF LOCAL-AWARE ATTRIBUTE RELEVANCE FOR DEVICE CLASSIFICATION AND CLUSTERING

(71) Applicant: Cisco Technology, Inc, San Jose, CA (US)

(72) Inventors: Grégory Mermoud, Veyras (CH); David Tedaldi, Zurich (CH); Pierre-André Savalle, Rueil-Malmaison (FR); Jean-Philippe Vasseur, Saint Martin d'uriage (FR); Jürg Nicolaus Diemand, Pfäffikon (CH)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 16/830,717

(22) Filed: Mar. 26, 2020

(65) Prior Publication Data
US 2021/0303598 A1 Sep. 30, 2021

(51) Int. Cl.
*G06F 16/28* (2019.01)
*G06F 16/23* (2019.01)

(52) U.S. Cl.
CPC ........ *G06F 16/285* (2019.01); *G06F 16/2358* (2019.01)

(58) Field of Classification Search
CPC ............... G06F 16/285; G06F 16/2358; G06F 16/9024; G06F 16/24578; G06F 16/35; G06F 16/287; H04L 41/0893; H04L 41/12; H04L 41/14; H04L 43/065; H04L 67/125

USPC ......................................................... 707/737
See application file for complete search history.

(56) References Cited

U.S. PATENT DOCUMENTS

| | | | |
|---|---|---|---|
| 8,813,236 | B1 | 8/2014 | Saha et al. |
| 10,440,577 | B1 | 10/2019 | Vasseur et al. |
| 10,462,171 | B2 | 10/2019 | Weingarten et al. |
| 2016/0359872 | A1* | 12/2016 | Yadav ................. H04L 63/1425 |
| 2018/0270229 | A1* | 9/2018 | Zhang .................. H04W 12/06 |
| 2020/0007391 | A1 | 1/2020 | Yang et al. |

OTHER PUBLICATIONS

Gärdenfors, Peter, "How to make the Semantic Web more semantic", Formal Ontology in Information Systems, 2004, 19 pages, IOS Press.

(Continued)

*Primary Examiner* — Evan Aspinwall
(74) *Attorney, Agent, or Firm* — Behmke Innovation Group LLC; Kenneth J. Heywood; Jonathon P. Western

(57) ABSTRACT

In various embodiments, a device classification service obtains data indicative of device attributes of a plurality of devices. The device classification service forms, based on the obtained data indicative of the device attributes, a concept graph that comprises nodes that represent different sets of the device attributes. The device classification service determines, by analyzing the concept graph, a relevance score for each of the device attributes that quantifies how relevant that attribute is to classifying a device by its device type. The device classification service uses the relevance scores for the device attributes to cluster the plurality of devices into device type clusters by their device attributes.

20 Claims, 11 Drawing Sheets

(56) References Cited

OTHER PUBLICATIONS

Poelmans, et al., "Formal Concept Analysis in Knowledge Discovery: A Survey", online: https://lirias.kuleuven.be/retrieve/119102, Aug. 2010, 14 pages.
Stumme, Gerd, "Efficient Data Mining Based on Formal Concept Analysis", online: https://www.kde.cs.uni-kassel.de/wp-content/uploads/lehre/ss2005/kdd/folien/Kap4-Ergaenzung-FBA.pdf, 2002, 52 pages, DEXA.
"Formal Concept Analysis", online: https://en.wikipedia.org/wiki/Formal_concept_analysis, Feb. 2012, (edited Jan. 12, 2020) 11 pages, Wikimedia Foundation, Inc.

\* cited by examiner

UNSUPERVISED LEARNING OF LOCAL-AWARE ATTRIBUTE RELEVANCE FOR DEVICE CLASSIFICATION AND CLUSTERING

TECHNICAL FIELD

The present disclosure relates generally to computer networks, and, more particularly, to the unsupervised learning of local-aware attribute relevance for device classification and clustering.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute) and applying a device classification rule to the observed behavior. Machine learning can also be leveraged to learn the set of device attributes associated with a particular device type, for purposes of generating such a classification rule. However, testing has revealed that only certain device attributes are actually relevant to distinguish between devices of different types.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
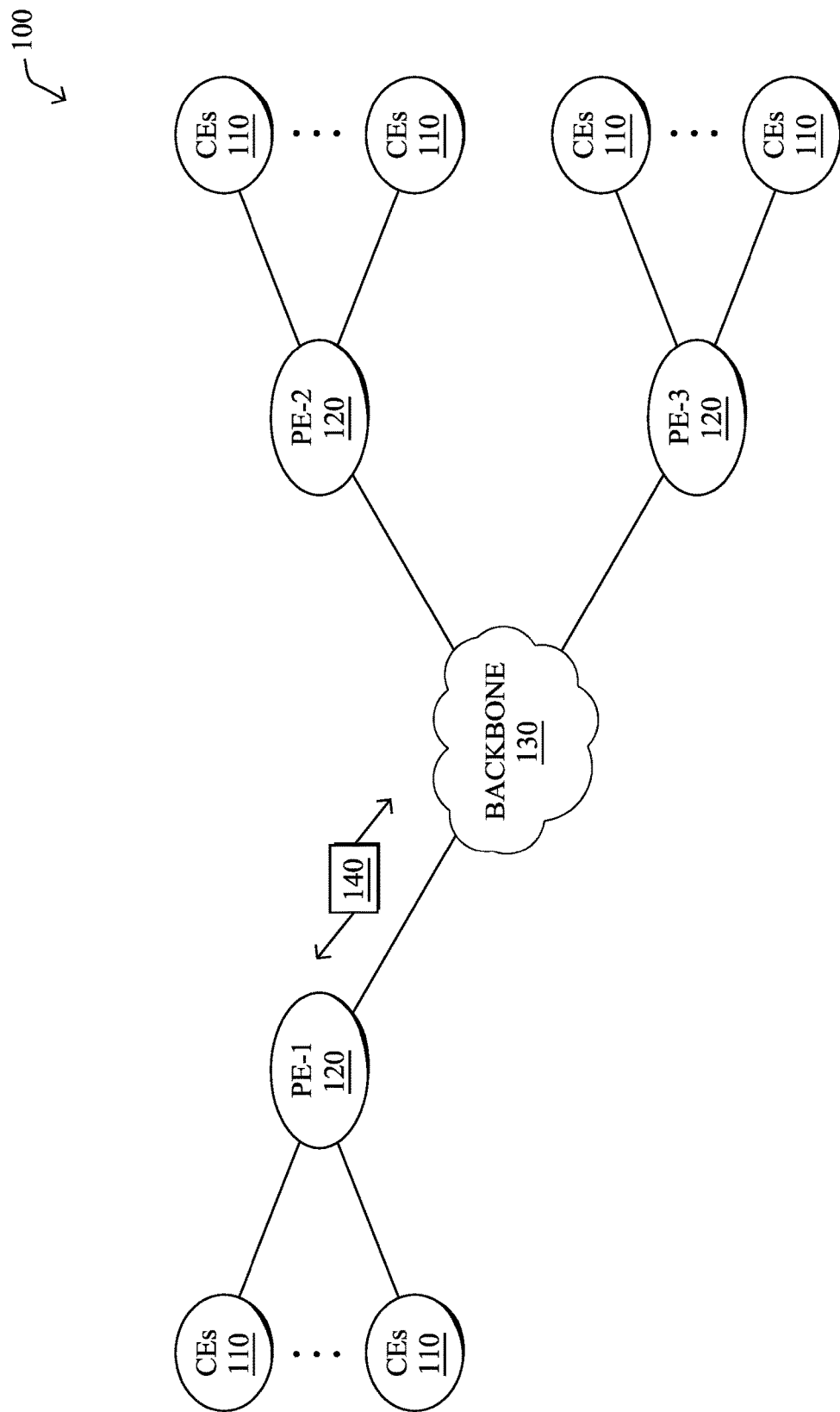
FIGS. 1A-1B illustrate an example communication network.

According to one or more embodiments of the disclosure, a device classification service obtains data indicative of device attributes of a plurality of devices. The device classification service forms, based on the obtained data indicative of the device attributes, a concept graph that comprises nodes that represent different sets of the device attributes. The device classification service determines, by analyzing the concept graph, a relevance score for each of the device attributes that quantifies how relevant that attribute is to classifying a device by its device type. The device classification service uses the relevance scores for the device attributes to cluster the plurality of devices into device type clusters by their device attributes.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
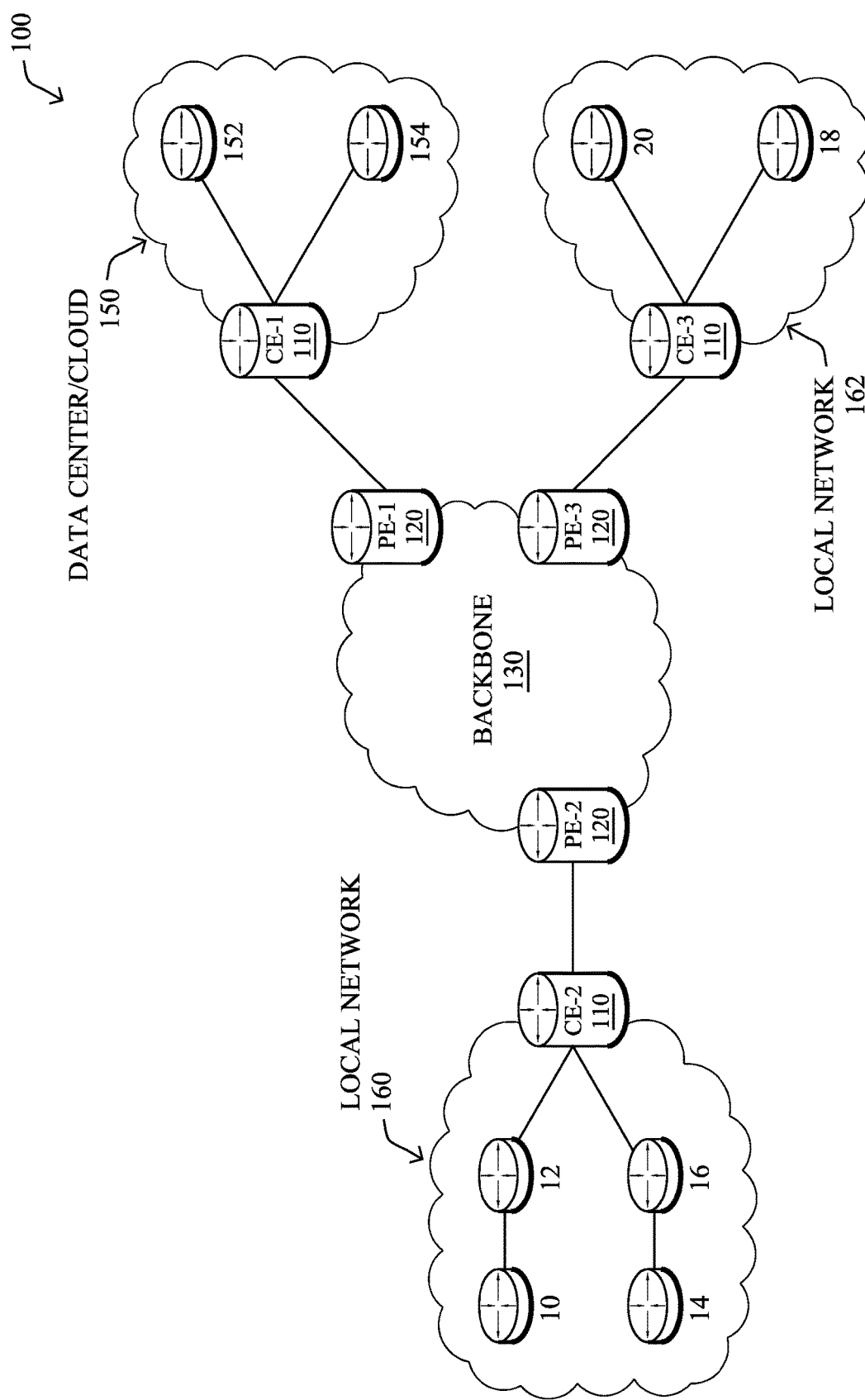

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
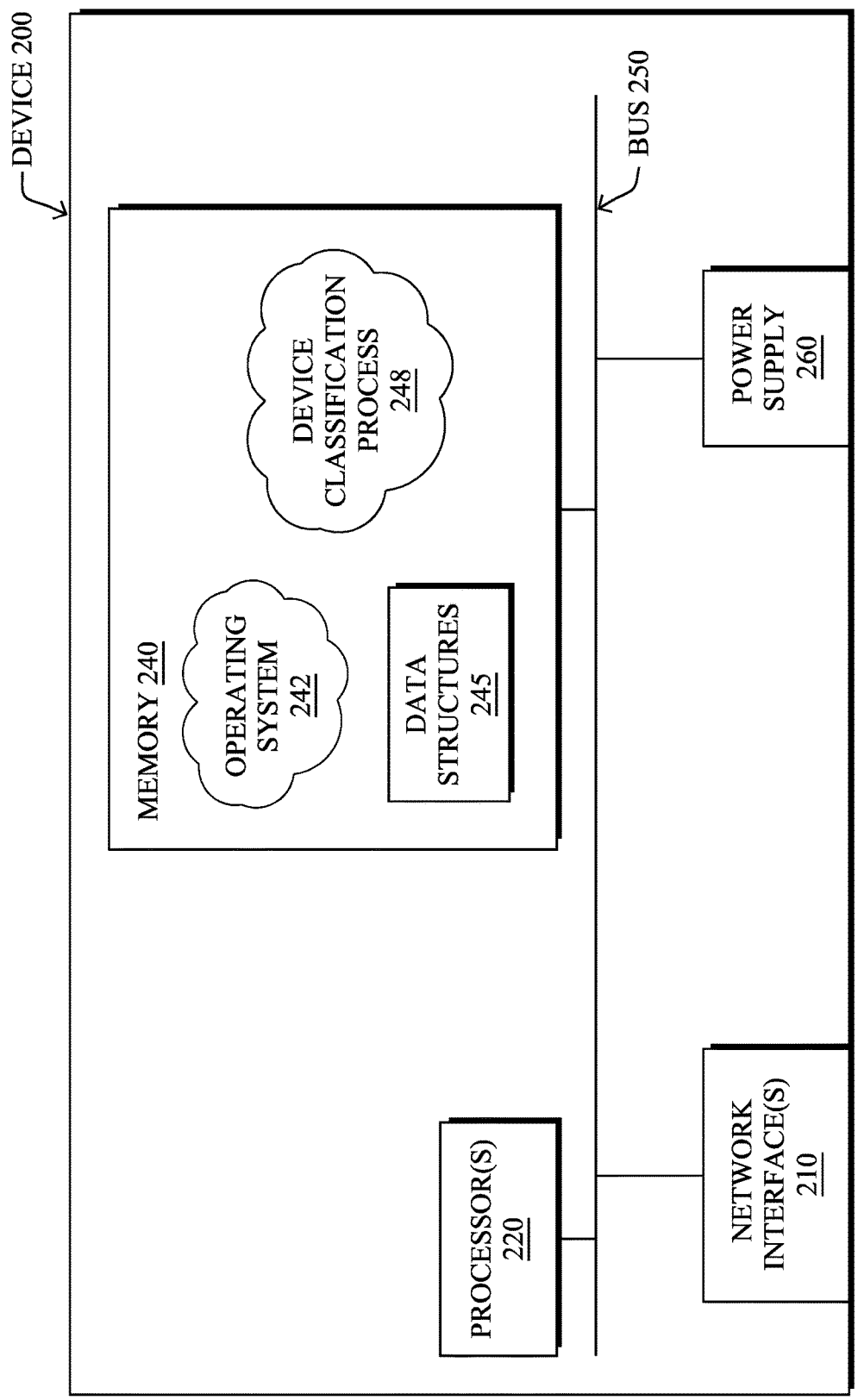
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal attributes (e.g., flows that occur around the same time or within the same time window, etc.), combinations thereof, or based on any other set of flow attributes.

Figure 3:
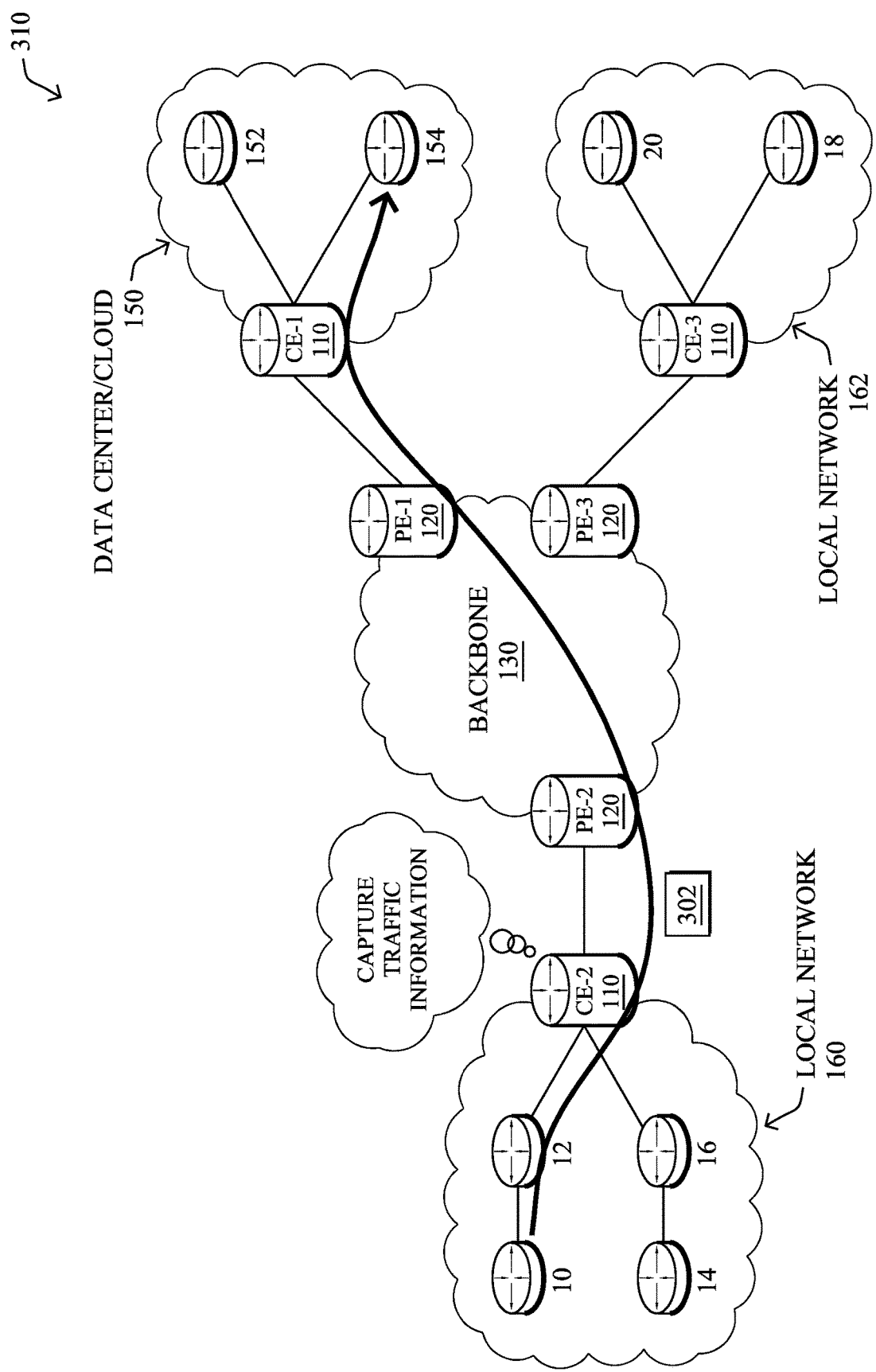
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
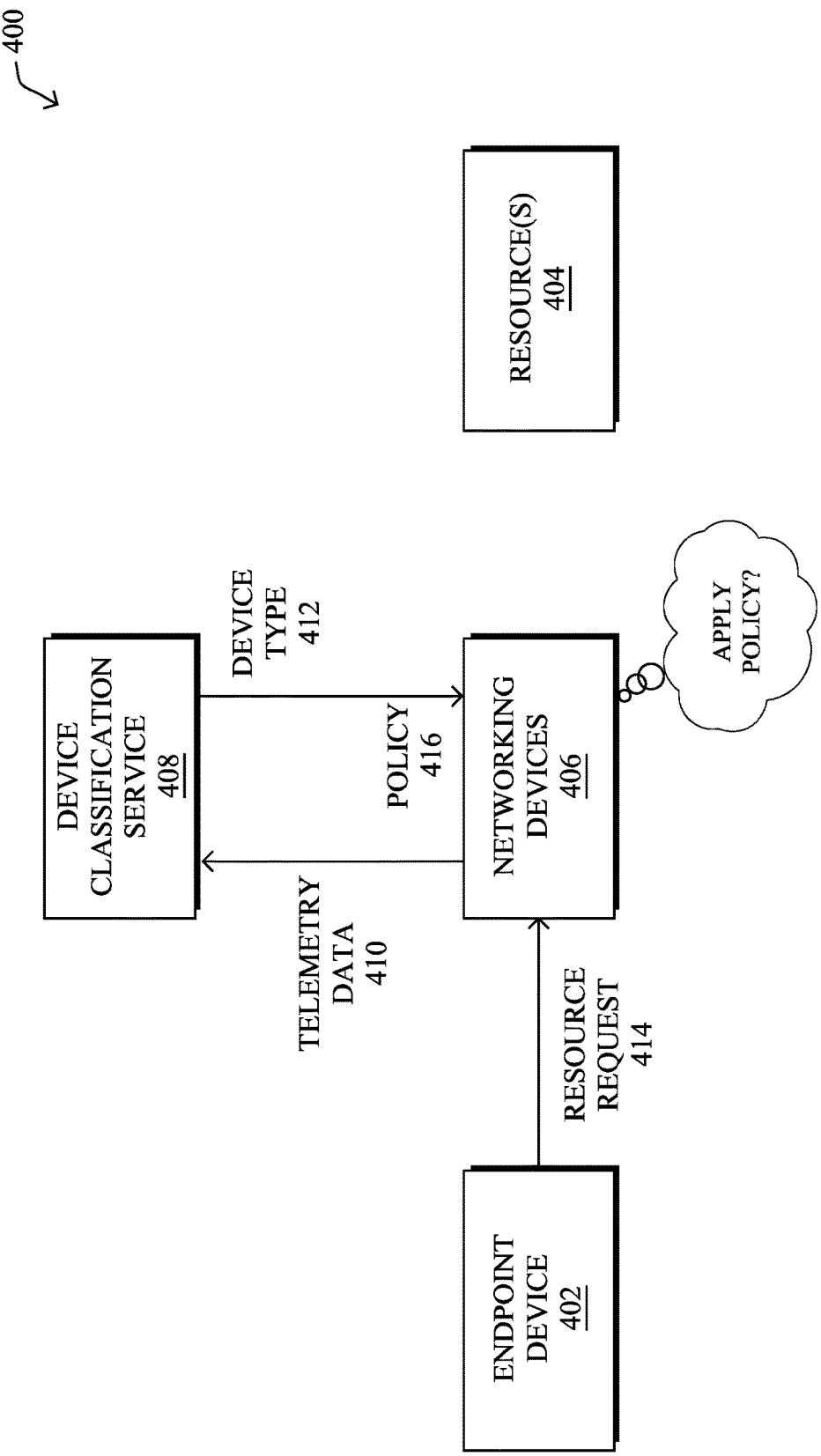
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses

SPAN probes, to get messages in INIT-REBOOT and SELECTING states, use of ARP cache for IP/MAC binding, etc.

Netflow probes

HTTP probes to obtain information such as the OS of the device, Web browser information, etc.

RADIUS probes

SNMP to retrieve MIB object or receives traps

DNS probes to get the Fully Qualified Domain Name (FQDN)

etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
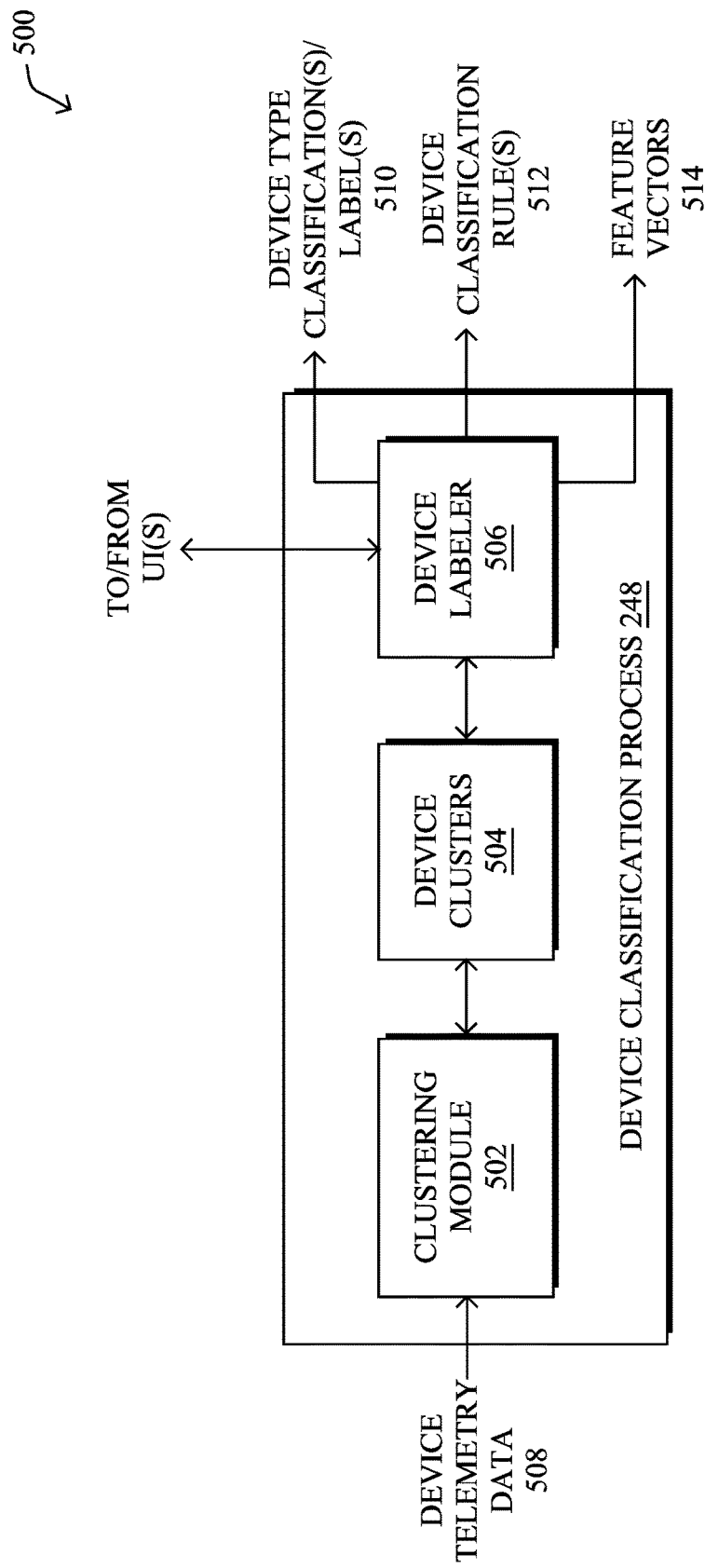
FIG. 5 illustrates an example architecture for a device classification process.

FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc. In other words, device telemetry data 508 may capture the various behavioral and other attributes of a device in a network.

In turn, device classification process 248 may output a device type classification/label 510 for a device under scrutiny, thereby allowing the receiving entity to apply network policies to the device, based on its device type classification(s)/label(s) 510. For example, one such network policy may cause a networking device to prevent an MRI machine from accessing the Internet or another resource via the network.

In various embodiments, the components 502-506 of device classification process 248 may leverage active learning, to assign device type classification(s)/label(s) 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification 510. In cases in which device labeler 506 is unable to classify the cluster 504 with sufficient confidence, it may send a label request to a user interface (UI), seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification/label 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508, represented as positive and negative feature vectors 514, and the device type labels obtained from experts through active learning. For example, device labeler 506 may aggregate the labels obtained from the experts, to form a finalized device type classification label 510 for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks. etc.

For purposes of illustration, a device classification rule 512 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc.

As noted above, device identification is without any doubt a major and critical component of any Secure Network Access solution. For example, the Identification Service Engine (ISE) by Cisco Systems, Inc., is typically used to apply policies and implement various form of micro-segmentation in the network. A very common approach for allocating policies lies in identifying the device type of the endpoint device and selecting a policy to be applied to it, based on this identification. Most device classification systems (DCS) rely on simple rules and heuristics to classify devices. However, more advanced approaches, such as those described above, aim to provide a more comprehensive solution whereby the system automatically clusters unknown devices into groups of similar devices and learn classification rules from them, instead of being hand-crafted by an expert.

One key challenge faced by a machine learning-based device classification service is determining which device attributes are actually relevant for purposes of distinguishing between devices of different types. Said differently, a device attribute is relevant for purposes of type classification, if that attribute is a predictor of the device being of a certain device type. Indeed, a given endpoint device may be characterized by a set of device attributes (e.g., OUI, HTTP User-Agent, DHCP fingerprint and class identifier, MDM, application used, etc.), whose relevance depends on their respective value and, potentially, the value of the other attributes, as well. As an example, if the OUI of an endpoint device is "Apple, Inc.," this is a clear indication that the manufacturer is, indeed, Apple. However, if the OUI of the endpoint device is "Freescale Semiconductor," this attribute is not very relevant for the classification, as Freescale provides network chips to thousands of manufacturers in the world. In addition, the relevance of a given attribute is often local, in that it also depends on the value of other device attributes. For instance, testing has shown that the presence of a given token (e.g., the token "X10") in the HTTP User-Agent is a very strong discriminator of the device type 'HTC One X10,' if and only if its OUI attribute is "Mediatek Inc.," but is irrelevant otherwise.

Unsupervised Learning of Local-Aware Attribute Relevance for Device Classification and Clustering The techniques herein introduce an unsupervised learning approach that aids a device classification system/service in selecting relevant device attributes for purposes of device classification and clustering. In some aspects, the techniques herein allow the device classification service to tune the distance function used for clustering devices in a way that is local. Indeed, the attributes of a given device may or may not be discriminative depending on other attributes, which makes the construction of an appropriate distance function extremely challenging. In further aspects, the techniques herein may leverage a so-called concept lattice to infer the relevance of different attributes in a given context, and reuse the resulting data structure to adapt the clustering strategies of the service.

Specifically, according to various embodiments herein, a device classification service obtains data indicative of device attributes of a plurality of devices. The device classification service forms, based on the obtained data indicative of the device attributes, a concept graph that comprises nodes that represent different sets of the device attributes. The device classification service determines, by analyzing the concept graph, a relevance score for each of the device attributes that quantifies how relevant that attribute is to classifying a device by its device type. The device classification service uses the relevance scores for the device attributes to cluster the plurality of devices into device type clusters by their device attributes.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Figure 6:
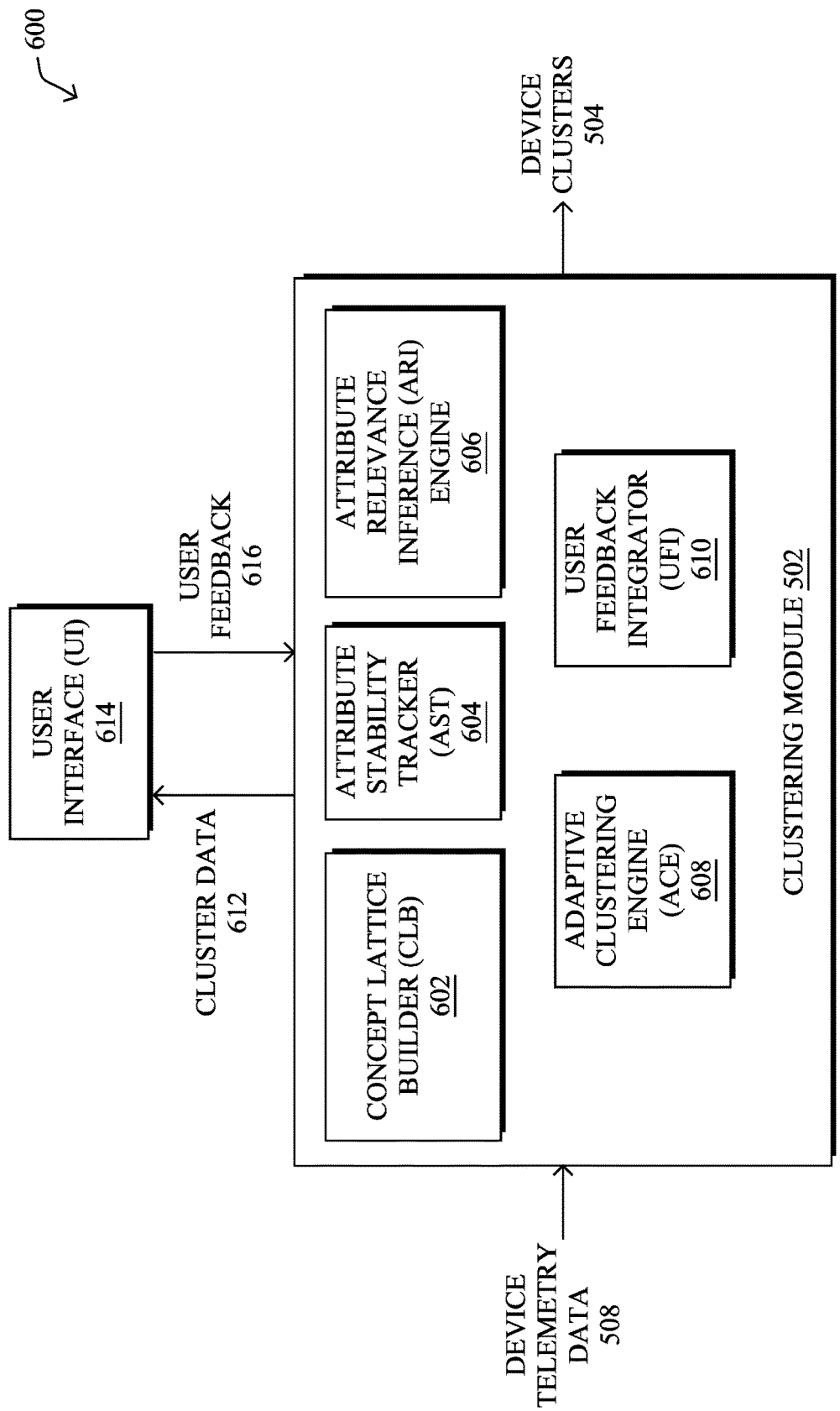
FIG. 6 illustrates an example architecture for learning device attribute relevance for device classification and clustering.

FIG. 6 illustrates an example architecture 600 for learning device attribute relevance for device classification and clustering, according to various embodiments. At the core of architecture 600 may be clustering module 502, described previously with respect to FIG. 5, which is responsible for generating device clusters that can be labeled by type and/or used to generate device classification rules. As shown, clustering module 502 may comprise any or all of the following components: a concept lattice builder (CLB) 602, an attribute stability tracker (AST) 604, an attribute relevance inference (ARI) engine 606, an adaptive clustering engine (ACE) 608, and/or a user feedback integrator (UFI) 610. The components 602-610 may be implemented either on a single device or in a distributed manner, in which case the combined devices may be viewed as a singular device for purposes of implementing the techniques herein. Further, the functionalities of the components of architecture 600 may also be combined, omitted, or implemented as part of other processes, as desired.

Concept lattice builder (CLB) 602 is configured to form what are referred to as concept graphs/lattices, based on the device attributes indicated by device telemetry data 508, according to various embodiments. In one embodiment, such a concept graph/lattice may take the form of a Directed Acyclic Graph (DAG) of "concepts," by applying Formal Concept Analysis (FCA) to device telemetry data 508. However, in further embodiments, CLB 602 may also form a concept graph/lattice using any other suitable approach, as well.

Figure 7A:
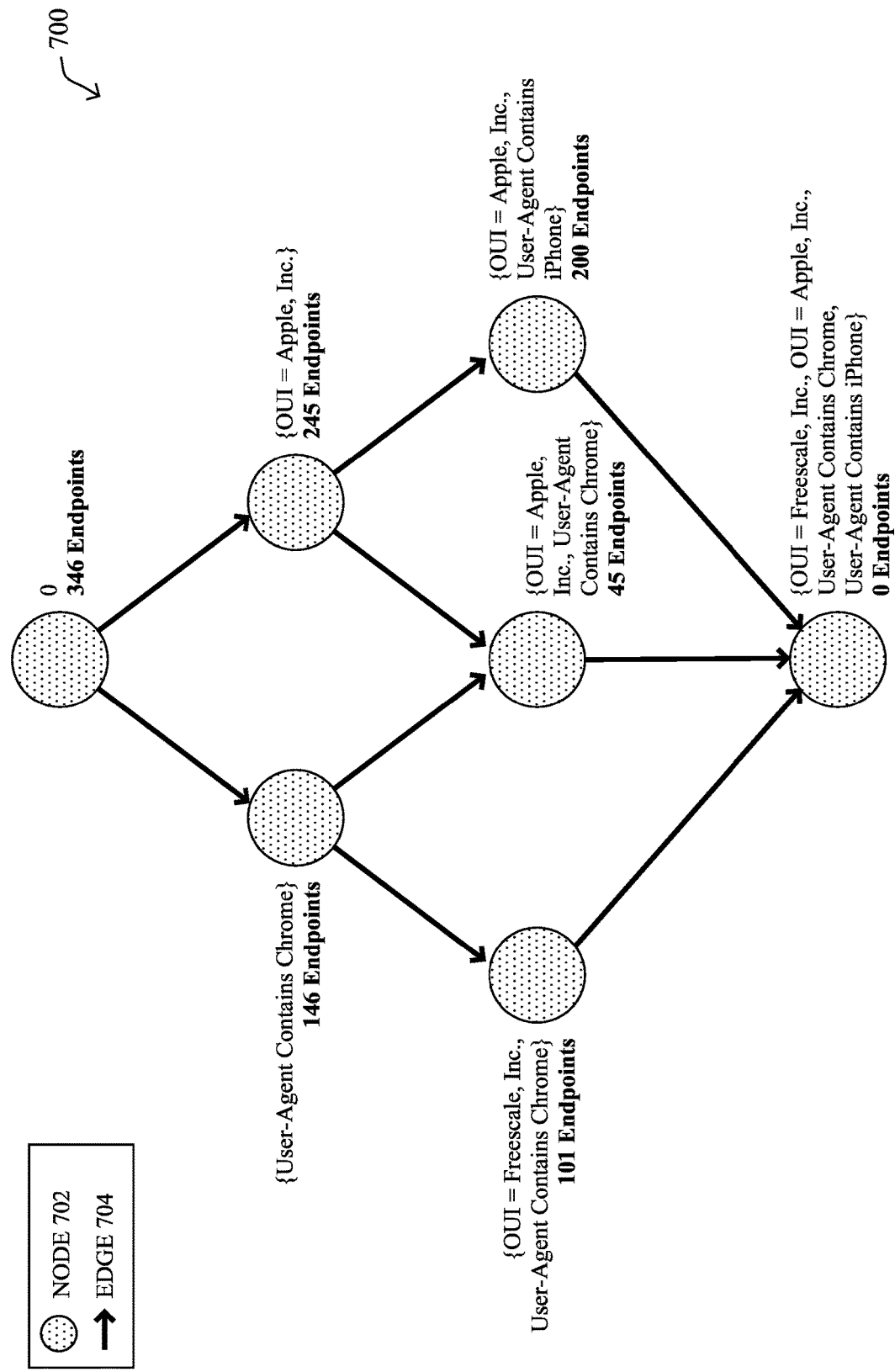
FIGS. 7A-7C illustrate example concept graphs.

FIG. 7A illustrates an example concept graph 700 that CLB 602 may form. As shown, concept graph 700 takes the form of a DAG comprising nodes 702 that are interconnected by directed edges 704. The direction of an edge 704 defines a relationship between nodes such that a given edge 704 is directed from a "parent" node 702 towards its "child" node 702.

More specifically, graph 700 was formed based on the various device attributes observed for a set of 346 endpoint devices. In various embodiments, each of nodes 702 may be associated with a different set of device attributes observed among the endpoint devices. Typically, the root node of the DAG (e.g., the node 702 in graph 700 without a parent) will represent a null set of device attributes. From there, the child nodes 702 of the root of graph 700 may each have one device attribute/concept. Traversing down a directed path in graph 700 will also add attributes/concepts to the sets associated with the nodes 702 farther away from the root. In addition, more distal nodes away from the root may also inherit the attributes/concepts of their parent(s).

In some embodiments, each node 702 in concept graph 700 may also be associated with a count of the endpoints that exhibited the device attributes represented by that node. For example, as shown, the root node of 700 may match the full set of 346 endpoints tested. From there, the root node has two children: a first node 702 that represents the concept/attribute set {HTTP user-agent='Chrome' }, which was observed in the traffic of 146 of the endpoints and a second node 702 that represents the concept/attribute set {OUI='Apple, Inc.' }, which was observed for 245 of the endpoints. Note that each of these concepts overlaps for 45 of the endpoints. That is, 45 of the endpoints exhibited the combined attribute set {OUI='Apple, Inc.', HTTP user-agent contains 'Chrome' }. Further combinations of device attributes were also observed, with 101 endpoints exhibiting the concept/set of device attributes {OUI='Freescale, Inc.', HTTP user-agent contains 'Chrome' } and 200 of the endpoints were observed with the concept/set of device attributes {OUI='Apple, Inc.', HTTP user-agent contains 'iPhone' }. The node 702 at the bottom of graph 700, also referred to the minimally general concept or infimum in FCA terminology, requires a match of all of the attributes {OUI='Freescale, Inc', OUI='Apple, Inc.', HTTP user-agent contains 'Chrome,' HTTP user-agent contains 'iPhone' }. This node has zero endpoints associated with it, as the two OUI attributes, 'Apple, Inc.' and 'Freescale, Inc.' were mutually exclusive.

Referring again to FIG. 6, attribute stability tracker (AST) 604 is configured to assess the stability of the attributes/concepts in the concept graph/lattice built by CLB 602, according to various embodiments. In some implementations, AST 604 may be hosted at the edge of the network under observation and receive the graph generated by a centrally hosted CLB 602 for analysis.

In some embodiments, AST 604 may assess the stability of the device attributes by monitoring every attribute change of the endpoints associated with the concept graph (e.g., every endpoint attached to the network elements for which AST 604 is responsible, etc.). As very such attribute change will cause the corresponding endpoint to move from one node of the graph to another. This may require updating the concept graph, as new attributes appear that have not been previously observed. This can be done by CLB 602 recomputing a full FCA or by using iterative algorithms for updating the graph.

For example, AST 604 may record the trajectories of the various device attributes for the endpoint devices and aggregate them over time, to build a transition matrix $T=(T_{i,j})$ where $T_{i,j}$ describes the likelihood that an endpoint jumps from node i to node j in the concept graph/lattice. Such tracking can be achieved, for instance, by associating a unique device identifier (e.g., its MAC) with its observed attributes. In turn, AST 604 may report the transition matrix T to attribute relevance inference (ARI) engine 606 (e.g., periodically, on detection of a change, on demand, etc.), whose functions are detailed below. Note that transition matrix T is typically of very high dimension, but it is also extremely sparse (e.g., most attribute transitions have a rate equal to zero), thus reducing the memory and network overhead.

As new nodes are added to the graph by CLB 602 to capture new concepts/sets of device attributes, the size of transition matrix T will also keep on increasing. Conversely, as certain device attributes disappear from observation, it may also be possible for CLB 602 to prune their corresponding nodes from the concept graph/lattice. In one embodiment this can be achieved by CLB 602 simply tracking the last time a certain value had been recorded or observed, comparing that value to an expiration threshold, and removing the corresponding node(s) from the graph. Consequently, the corresponding transition matrix T computed by AST 604 will also be reduced in size.

Attribute relevance inference (ARI) engine 606 is configured to receive the transition matrices $T_1, T_2, \ldots$ from AST 604, or a plurality of such modules in the distributed case, and aggregate the matrices into a global matrix $T_{global}$. In turn, ARI engine 606 may use the global matrix $T_{global}$ to infer local relevance of a given device attribute.

More specifically, ARI engine 606 may, for each of the observed device attributes, compute a relevance score that quantifies how relevant that attribute is to classifying a device by its device type, in various embodiments. Indeed, assuming that two nodes on concept graph have a large transition rates (in any direction, or both), it is clear that the attributes that caused the transition are irrelevant in the specific context defined by their common ancestor. More specifically, if these attributes are "flappy" for a given endpoint (e.g., alternating between the two), they are definitely not a reliable way to identify the type of the endpoint device. At the same time, these same attributes may be very reliable for another type of device (that is, another local region of the concept graph).

Figure 7B:
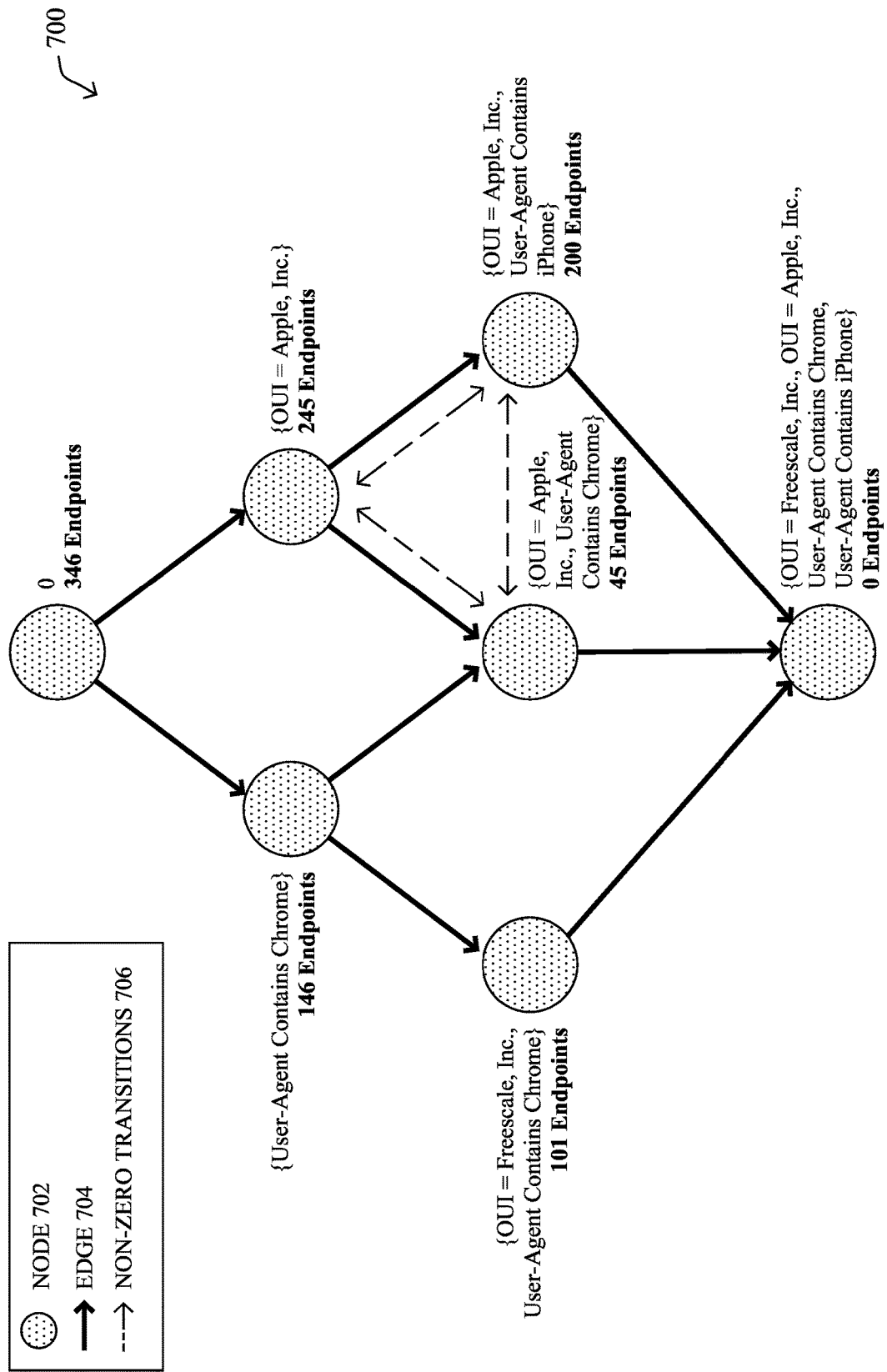

FIG. 7B illustrates an example of non-zero transitions between device attributes that were observed during testing. Continuing the example of FIG. 7A, FIG. 7B shows non-zero transitions 706 that were observed over time between certain device attributes. More specifically, for the devices whose OUI='Apple, Inc.', their HTTP user-agent fields alternated between values that contained 'Chrome' and ones that contained 'iPhone.' Since the attribute set {OUI='Apple, Inc.'} remained the same across these endpoints, AST 604 may determine that this attribute is stable. However, the instability of the HTTP user-agent attributes will lead ARI engine 606 to assign low relevancy scores to these attributes under the condition that OUI='Apple, Inc.'

Figure 7C:
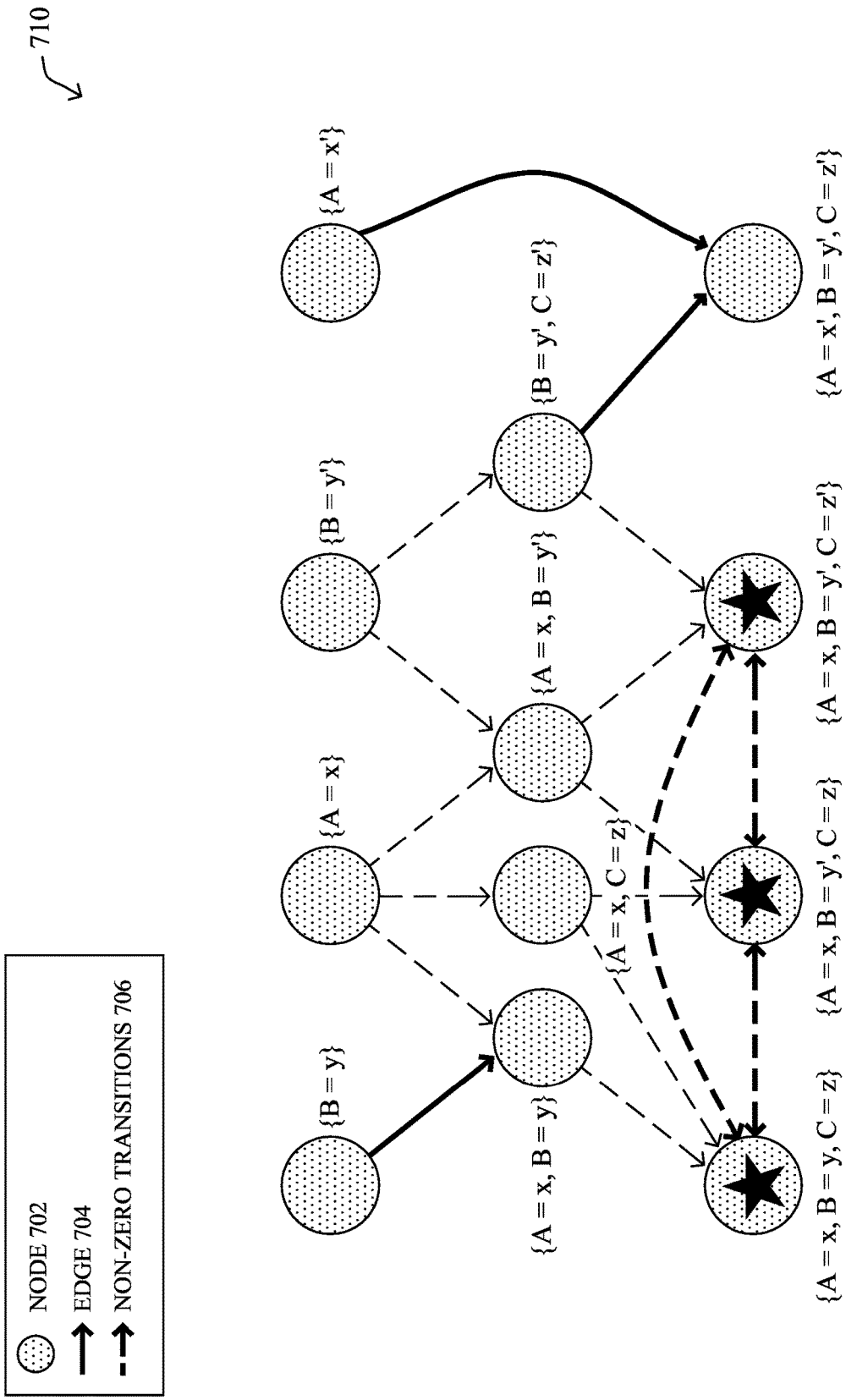

FIG. 7C illustrate a more complex example concept graph 710 that may be assessed by ARI engine 606. Here, assume that there are three telemetry metrics, A, B, and C, can take on any of the following values: x or x' for A, y or y' for B, and z or z' for C, resulting in the concept graph 710, shown. To make matters even more complicated, further assume that non-zero attribute transitions 706 were observed between the three nodes 702 flagged in FIG. 7C with stars, who share multiple common ancestors across graph 710. For instance, C and B are bi-modal under the context {A=x}. Similarly, under the context {B=y'}, attribute C is also bi-modal with values {C=z} and {C=z'}. Accordingly, the final output of ARI engine 606 may be an annotated form of graph 710 whereby each node 702 is decorated to a (sparse) relevance vector that associates every device attribute to a score (e.g., the conditional entropy of the attribute conditioned on that specific node).

Referring again to FIG. 6, adaptive clustering engine (ACE) 608 may take as input the results of ARI engine 606 (e.g., a concept graph annotated with attribute relevance scores) and, in turn, perform clustering on the endpoint devices. In various embodiments, ACE 608 may do so using a clustering distance metric that accounts for the relevance of the different attributes inferred by ARI 606. For example, ACE 608 may, for each endpoint device, walk down the concept graph/lattice to the node that has the most specific set of attributes of that endpoint. In turn, ACE 608 may aggregate the relevance score of each attribute up to that point. ACE 608 may then account for this relevance score when computing the distance between the endpoint and other endpoints, to assign the endpoint to a device cluster (e.g., a cluster 504 in FIG. 5).

In particular, device attributes with a large entropy may be attributed a smaller weight in the distance function used by ACE 608 to perform the clustering. Interestingly, this may also lead to different endpoints having different respective attribute relevance scores. For instance, consider two endpoints, $E_1$ and $E_2$. The HTTP.user-agent value may be critical/highly relevant for endpoint $E_1$ whereas it is not for $E_2$. In such cases, the maximum of the relevance score should be used by ACE 608 when computing their distances, as it is clear that if an attribute is important for any of the two endpoints, it should be considered in the (symmetrical) distance metric, when forming device clusters.

A further potential component of clustering module 502 is user feedback integrator (UFI) 610, which may provide cluster data 612 regarding the device clusters formed by ACE 608 to a user interface (UI) 614 and receive user feedback 616, in response. For example, user feedback 616 may indicate whether the user believes a particular cluster is too granular or too coarse, thereby rejecting the cluster. Or, in another example, user feedback 616 may indicate that the user believes two or more of the clusters should be combined into a single cluster. In particular, if the user of UI 614 rejects a cluster, UFI 610 may seek more details from the user about their rationale for the rejection.

In various embodiments, UFI 610 may use user feedback 616 to augment the annotated graph produced by ARI engine 606 with scores inferred from user feedback 616. Doing so allows ACE 608 to adjust how it clusters the endpoint devices based on their observed device attributes. For example, the scoring by UFI 610 may cause the clusters formed by ACE 608 to be merged, resized, or the like. In another embodiment, UFI 610 may instead leverage user feedback 616 to reweight the transition matrices produced by AST 604, so as to change the behavior of ARI engine 606 and, consequently, how ACE 608 clusters the endpoint devices.

Figure 8:
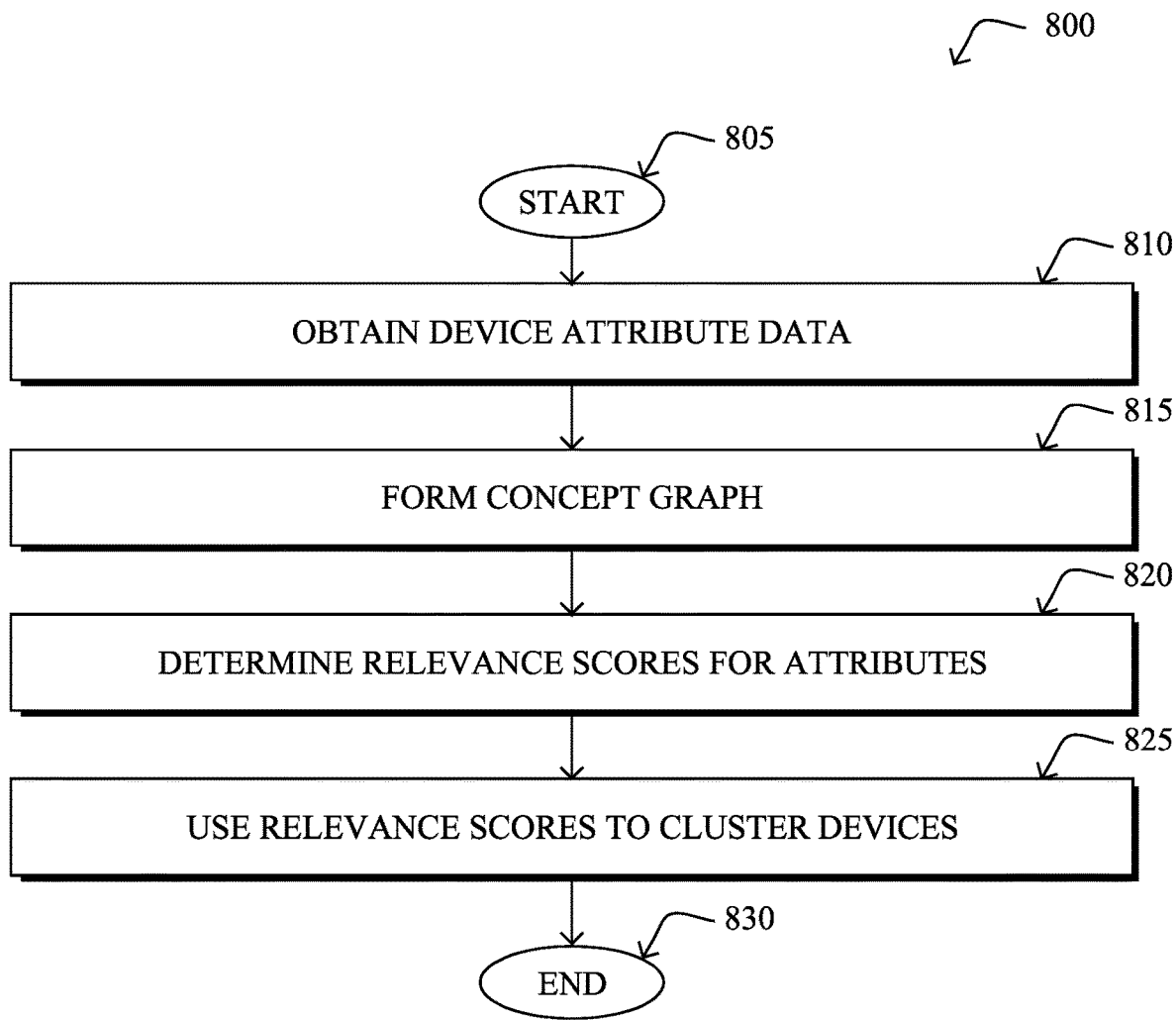
FIG. 8 illustrates an example simplified procedure for the unsupervised learning of local-aware attribute relevance for device classification and clustering.

FIG. 8 illustrates an example simplified procedure for the unsupervised learning of local-aware attribute relevance for device classification and clustering, in accordance with one or more embodiments described herein. For example, a non-generic, specifically configured device (e.g., device 200) may perform procedure 800 by executing stored instructions (e.g., process 248), to provide a device classification service to one or more networks. The procedure 800 may start at step 805, and continues to step 810, where, as described in greater detail above, the device classification service may obtain data indicative of device attributes of a plurality of devices. For example, such attributes may include, but are not limited to, any or all of the following: the OUIs, HTTP user-agents, DHCP parameters, application usages, other traffic characteristics, or the like, of the devices.

At step 815, as detailed above, the device classification service may form, based on the obtained data indicative of the device attributes, a concept graph that comprises nodes that represent different sets of the device attributes. For example, in some cases, the concept graph may take the form of a directed acyclic graph (DAG), with each node in the DAG is associated with a count of the devices in the plurality that have the set of device attributes represented by that node.

At step 820, the device classification service may determine a relevance score for each of the device attributes that quantifies how relevant that attribute is to classifying a device by its device type, by analyzing the concept graph, as described in greater detail above. In some embodiments, the service may do so by tracking changes in the device attributes of the plurality of devices and assessing stability of each of the device attributes based on the tracked changes. In further embodiments, the service may assign a low relevance score to an unstable device attribute.

At step 825, as detailed above, the device classification service may use the relevance scores for the device attributes to cluster the plurality of devices into device type clusters by their device attributes. For example, the service may compute a distance metric based on the relevance scores for the device attributes and cluster the plurality devices into the device type clusters based on the computed distance metric. In various embodiments, the device classification service may associate a device type label with a generated cluster and, in some embodiments, use the cluster to generate a device classification rule. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the learning of device attributes that are relevant for purposes of clustering and classifying a device by its device type. In some aspects, these techniques allow a device classification service to derive relevancy scores for the attributes through the use of a concept graph/lattice. In turn, the service may adjust how it clusters the devices by their attributes, based on the relevancy scores for those attributes.

While there have been shown and described illustrative embodiments that provide for the unsupervised learning of local-aware attribute relevance for device classification and clustering, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    obtaining, by a device executing a device classification service, data indicative of device attributes of a plurality of devices;
    forming, by the device and based on the obtained data indicative of the device attributes, a concept graph that comprises nodes that represent different sets of the device attributes;
    determining, by the device and by analyzing the concept graph, a relevance score for each of the device attributes that quantifies how relevant that attribute is to classifying a device by its device type;
    using, by the device, the relevance scores for the device attributes to cluster the plurality of devices into device type clusters by their device attributes; and
    applying, by the device, a network policy to a particular device of the plurality of devices based on a device type label associated with a device type cluster of the particular device.

2. The method as in claim 1, wherein the concept graph comprises a directed acyclic graph (DAG), and wherein each node in the DAG is associated with a count of the devices in the plurality that have the set of device attributes represented by that node.

3. The method as in claim 1, wherein determining the relevance score for each of the device attributes comprises:
    computing a conditional entropy of a device attribute conditioned on a node in the concept graph.

4. The method as in claim 1, further comprising:
    tracking changes in the device attributes of the plurality of devices; and
    assessing stability of each of the device attributes based on the tracked changes.

5. The method as in claim 4, wherein determining a relevance score for each of the device attributes comprises:
    assigning a low relevance score to an unstable device attribute.

6. The method as in claim 1, wherein using the relevance scores for the device attributes to cluster the plurality of devices into device type clusters by their device attributes comprises:
    computing a distance metric based on the relevance scores for the device attributes; and
    clustering the plurality devices into the device type clusters based on the computed distance metric.

7. The method as in claim 1, further comprising:
    receiving feedback from a user interface regarding one of the device type clusters; and
    adjusting the relevance scores for the device attributes based on the received feedback.

8. The method as in claim 1, further comprising:
    generating device classification rules from the device type clusters and their associated device attributes.

9. The method as in claim 1, wherein the device attributes comprise at least one of: a Hypertext Transfer Protocol (HTTP) user agent, an organizationally unique identifier (OUI), or a Dynamic Host Configuration Protocol (DHCP) parameter.

10. An apparatus, comprising:
    one or more network interfaces to communicate with one or more networks;
    a processor coupled to the network interfaces and configured to execute one or more processes; and
    a memory configured to store a process executable by the processor, the process when executed configured to:
        obtain data indicative of device attributes of a plurality of devices;
        form, based on the obtained data indicative of the device attributes, a concept graph that comprises nodes that represent different sets of the device attributes;
        determine, by analyzing thle concept graph, a relevance score for each of the device attributes that quantifies how relevant that attribute is to classifying a device by its device type;
        use the relevance scores for the device attributes to cluster the plurality of devices into device type clusters by their device attributes; and
        apply a network policy to a particular device of the plurality of devices based on a device type label associated with a device type cluster of the particular device.

11. The apparatus as in claim 10, wherein the concept graph comprises a directed acyclic graph (DAG), and wherein each node in the DAG is associated with a count of the devices in the plurality that have the set of device attributes represented by that node.

12. The apparatus as in claim 10, wherein the apparatus determines the relevance score for each of the device attributes by:
    computing a conditional entropy of a device attribute conditioned on a node in the concept graph.

13. The apparatus as in claim 10, wherein the process when executed is further configured to:
    track changes in the device attributes of the plurality of devices; and
    assess stability of each of the device attributes based on the tracked changes.

14. The apparatus as in claim 13, wherein the apparatus determines a relevance score for each of the device attributes by:

assigning a low relevance score to an unstable device attribute.

15. The apparatus as in claim 10, wherein the apparatus uses the relevance scores for the device attributes to cluster the plurality of devices into device type clusters by their device attributes by:

computing a distance metric based on the relevance scores for the device attributes; and clustering the plurality devices into the device type clusters based on the computed distance metric.

16. The apparatus as in claim 10, wherein the process when executed is further configured to:

receive feedback from a user interface regarding one of the device type clusters; and adjust the relevance scores for the device attributes based on the received feedback.

17. The apparatus as in claim 10, wherein the process when executed is further configured to:

generate device classification rules from the device type clusters and their associated device attributes.

18. The apparatus as in claim 10, wherein the device attributes comprise at least one of: a Hypertext Transfer Protocol (HTTP) user agent, an organizationally unique identifier (OUI), or a Dynamic Host Configuration Protocol (DHCP) parameter.

19. A tangible, non-transitory, computer-readable medium storing program instructions that cause a device executing a device classification service to execute a process comprising:

obtaining, by the device, data indicative of device attributes of a plurality of devices;

forming, by the device and based on the obtained data indicative of the device attributes, a concept graph that comprises nodes that represent different sets of the device attributes;

determining, by the device and by analyzing the concept graph, a relevance score for each of the device attributes that quantifies how relevant that attribute is to classifying a device by its device type;

using, by the device, the relevance scores for the device attributes to cluster the plurality of devices into device type clusters by their device attributes; and applying, by the device, a network policy to a particular device of the plurality of devices based on a device type label associated with a device type cluster of the particular device.

20. The computer-readable medium as in claim 19, wherein the process further comprises:

tracking changes in the device attributes of the plurality of devices; and assessing stability of each of the device attributes based on the tracked changes.

* * * * *